(12) United States Patent
Arakawa et al.

(10) Patent No.: US 7,710,246 B2
(45) Date of Patent: May 4, 2010

(54) VEHICLE DRIVING ASSIST SYSTEM

(75) Inventors: Toshiya Arakawa, Tokyo (JP);
Noriyoshi Matsuo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 202 days.

(21) Appl. No.: 11/527,533

(22) Filed: Sep. 27, 2006

(65) Prior Publication Data

US 2007/0069872 A1   Mar. 29, 2007

(30) Foreign Application Priority Data

Sep. 28, 2005   (JP) .............................. 2005-282663

(51) Int. Cl.
*B60Q 1/00* (2006.01)

(52) U.S. Cl. ........................ 340/435; 340/438; 340/901; 180/271

(58) Field of Classification Search ................ 340/435, 340/436, 438, 901; 180/271
See application file for complete search history.

(56) References Cited

U.S. PATENT DOCUMENTS

| 6,734,787 | B2 * | 5/2004 | Ikeda ........................ 340/425.5 |
| 6,989,754 | B2 * | 1/2006 | Kisacanin et al. ........... 340/576 |
| 2004/0150514 | A1 * | 8/2004 | Newman et al. ............ 340/435 |
| 2005/0128063 | A1 * | 6/2005 | Isaji et al. ................... 340/439 |
| 2005/0162261 | A1 * | 7/2005 | Li .............................. 340/435 |

FOREIGN PATENT DOCUMENTS

| JP | 2001-357498 | 12/2001 |
| JP | 2004-295472 | 10/2004 |

* cited by examiner

*Primary Examiner*—Toan N Pham
*Assistant Examiner*—Kerri McNally
(74) *Attorney, Agent, or Firm*—Smith, Gambrell & Russell, LLP

(57) ABSTRACT

A vehicle driving assist system including a front-side environment recognizing unit for generating distance information of a front-side environment, a visual line position detecting unit for detecting a driver's visual line position, and a gazing distance estimating unit for estimating a driver's gazing distance on the basis of the distance information and the visual line position.

12 Claims, 4 Drawing Sheets

IF L ≤ Z2

IF L > Z2

VEHICLE DRIVING ASSIST SYSTEM

CROSS REFERENCE TO RELATED APPLICATIONS

The disclosure of Japanese Application No. 2005-282663 filed on Sep. 28, 2005 including the specification, drawings, and abstract is incorporated herein by reference in its entirety.

BACKGROUND OF THE INVENTION

1. Field of the Invention

The present invention relates to a vehicle driving assist system that can give a proper alarm to a driver in accordance with a forward gazing state of the driver.

2. Description of the Related Art

Recently various techniques of detecting the traveling environment in front of a vehicle by using an in-vehicle mounted camera or the like and performing alarm control for obstacles in front of the vehicle have been developed and practically used. Furthermore, a technique of giving a natural alarm in accordance with a driver's state under the above alarm control has been also proposed. For example, JP-A-2004-295472 discloses a mechanism of giving no alarm or giving a weak alarm for an obstacle located within a predetermined distance from a vehicle if the direction of the visual line of the driver is coincident with the direction to the obstacle concerned.

However, according to the technique disclosed in the above publication, only the direction along which the driver pays his/her attention (hereinafter referred to as "gazing direction") is determined. Therefore, when the driver gives his/her visual line to an object other than the obstacle, it is impossible to estimate the distance from the driver to the object at which the driver gazes, and thus it is impossible to grasp whether the driver pays his/her attention to a near object or a far object. Therefore, when the driver pays attention to a far object, objects located at a short distance from the driver are out of driver's attention. Therefore, even when the direction of the driver's visual line is afterwards coincident with the direction to an obstacle located at a short distance due to the behavior of the obstacle concerned (the behavior of darting into the front side of the vehicle or the like), it is improper to output no alarm or output a weak alarm.

SUMMARY OF THE INVENTION

The present invention has been implemented in view of the foregoing situation, and has an object to provide a vehicle driving system that can perform natural and proper alarm control, etc. in consideration of not only a driver's gazing direction (i.e., the direction in which a driver pays his/her attention), but also a distance to an object at which the driver gazes (i.e., whether the object is far or near).

In order to attain the above object, there is provided a vehicle driving assist system comprising: a front-side environment recognizing unit for generating distance information of a front-side environment; a visual line position detecting unit for detecting the visual line position of a driver; and a gazing distance estimating unit for estimating the gazing distance of the driver (i.e., the distance from the driver to an object at which the driver gazes) on the basis of the distance information and the visual line position.

According to the vehicle driving assist system of the present invention, the natural and proper alarm control, etc. can be performed in consideration of not only the driver's gazing direction, but also the distance from the driver.

DESCRIPTION OF THE PREFERRED EMBODIMENTS

A preferred embodiment according to the present invention will be described hereunder with reference to the accompanying drawings.

Figure 1:
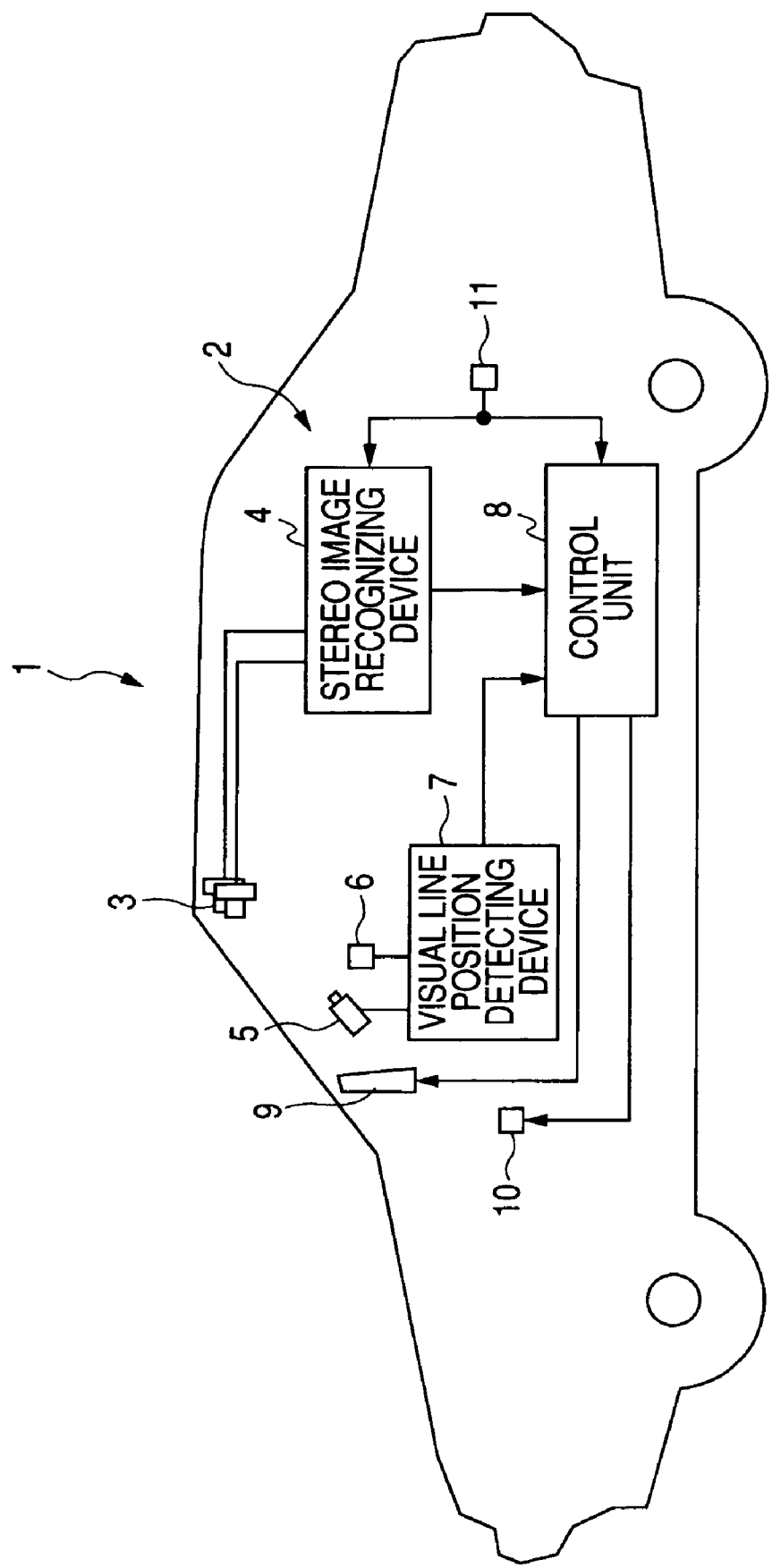
FIG. 1 is a diagram showing the construction of a driving assist system mounted in a vehicle.
Figure 2:
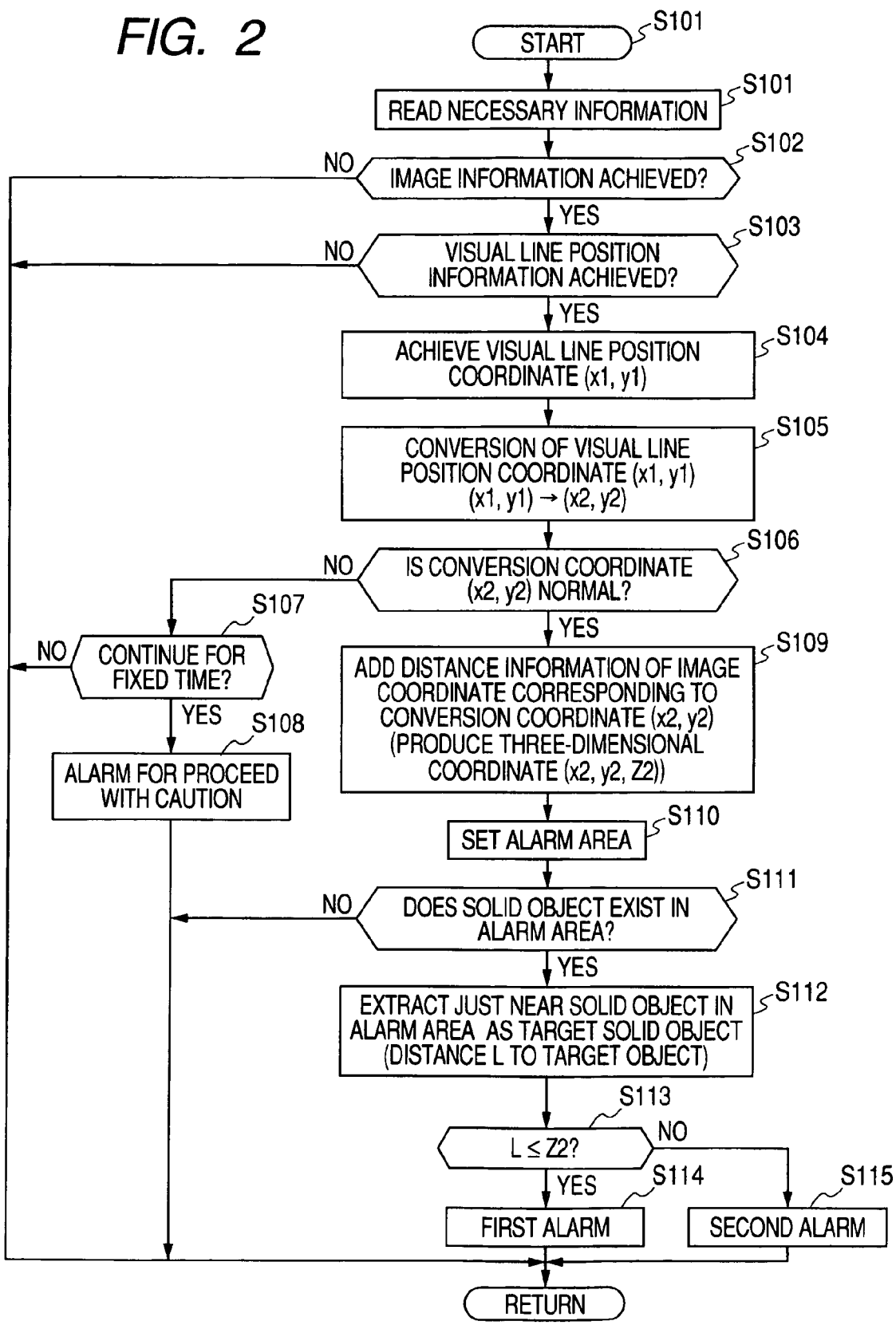
FIG. 2 is a flowchart showing an alarm control program.
Figure 3A:
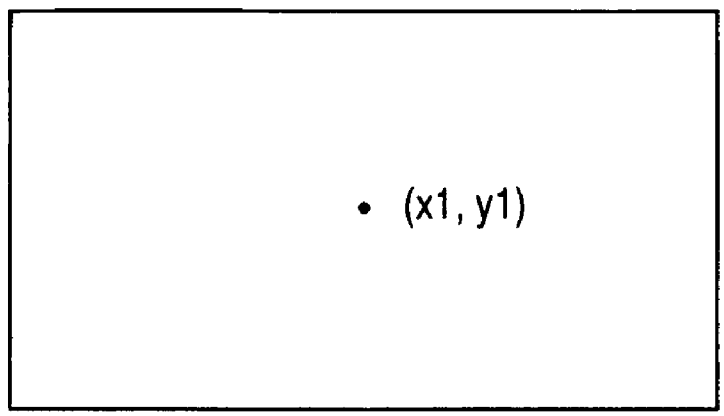
FIGS. 3A to 3C are diagrams showing the flow of coordinate conversion until a gazing distance is calculated from a visual line position coordinate.
Figure 3B:
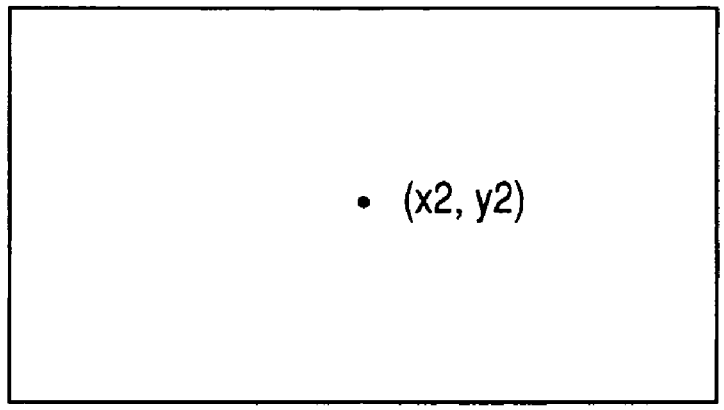
Figure 3C:
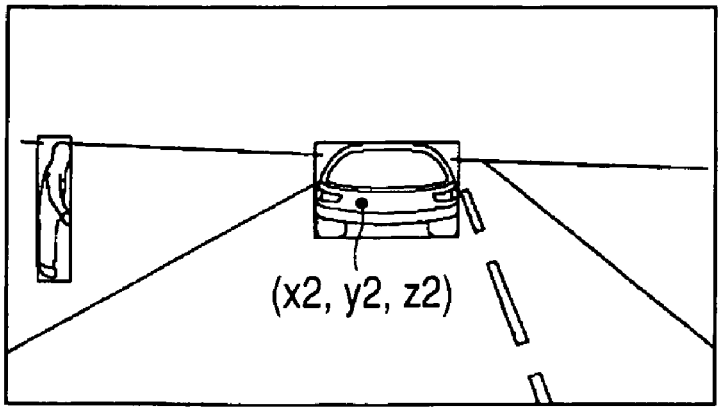
Figure 4A:
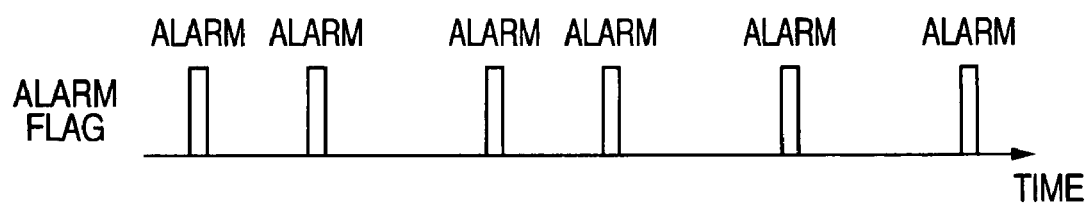
FIGS. 4A and 4B are diagrams showing the difference in alarm between a case of $L \leqq z2$ and a case of $L > z2$.
Figure 4B:
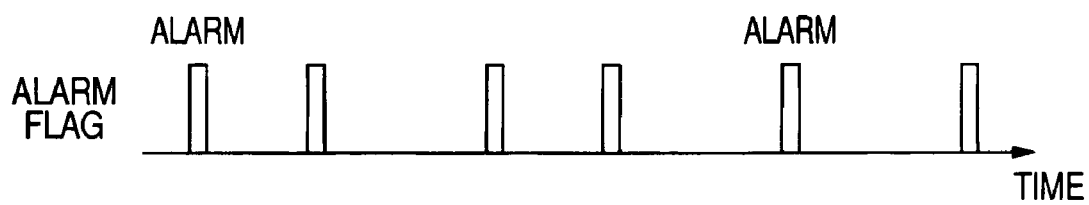

FIGS. 1 to 4 show an embodiment of the present invention, wherein FIG. 1 is a diagram showing the construction of a vehicle driving assist system mounted in a vehicle, FIG. 2 is a flowchart showing an alarm control program, FIGS. 3A to 3C are diagrams showing the flow of coordinate conversion until a gazing distance is calculated from a visual line position coordinate, and FIGS. 4A and 4B are diagrams showing the difference in alarm between a case of $L \leqq z2$ and a case of $L > z2$.

In FIG. 1, reference numeral 1 represents a vehicle such as a car (hereinafter referred to "own vehicle"). The own vehicle 1 is equipped with vehicle driving assist system 2 for performing alarm control which targets vehicles traveling in front of the own vehicle (hereinafter referred to as "preceding vehicle") and front obstacles (obstacles located in front of the own vehicle).

The vehicle driving assist system 2 is mainly equipped with a stereo camera 3 for catching images of the front side out of the own vehicle, a stereo image recognizing device 4 for processing the signal from the stereo camera 3, a visual field camera 5 for catching driver's eye movement, an infrared lamp 6, a visual line position detecting device 7 for detecting the visual line position of the driver by using the visual field camera 5 and the infrared lamp 6, a control unit 8, a monitor 9 for displaying an alarm and a voice generating device 10 for emitting an alarm.

Furthermore, the own vehicle 1 is equipped with an own vehicle speed sensor 11 for detecting the own vehicle speed, and the own vehicle speed from the own vehicle speed sensor 11 is input to the stereo image recognizing device 4 and the control unit 8.

The stereo camera 3 is constructed by a pair of (right and left) CCD cameras using a solid-state image pickup device such as a charge-coupled device (CCD) as a stereo optical system. The right and left CCD cameras are secured to the front side of the ceiling in the vehicle so as to be spaced from each other at a predetermined interval, and carries out stereo image-pickup operation on a target (solid object) out of the own vehicle from different points of view. Then, these cameras output image data to the stereo image recognizing device 4.

The image data from the stereo camera 3 and the respective signals of vehicle speed, etc. are input to the stereo image recognizing device 4. The stereo image recognizing device 4 detects front-side information such as solid object data, side wall data, and white line data in front of the own vehicle 1 on the basis of the image data, and estimates the travel road of the own vehicle 1 (the vehicle traveling road) on the basis of the front-side information and the driving state of the own vehicle 1. Then, a travel area is set on the basis of the vehicle traveling road (an area which contains the vehicle traveling road substantially at the center thereof and has a width of about 1.1 m from the vehicle traveling road in each of the right and left direction). Preceding vehicles in front of the own vehicle 1 are identified and extracted in accordance with the existence state of solid objects with respect to the travel area, and this result is output to the control unit 8.

For example, the processing of the image data from the stereo camera 3 in the stereo image recognizing device 4 is executed as follows. First, on the basis of the principle of triangular surveying, the distance information is achieved from the displacement amount in distance between the positions of a pair of stereo images of the front side of the own vehicle 1 which are picked up by the CCD cameras of the stereo camera 3, and a distance image representing a three-dimensional distance distribution is generated. On the basis of the three-dimensional distance distribution, well-known grouping processing is executed, and the processing result is compared with frames (windows) such as three-dimensional road shape data, side wall data, solid object data which are stored in advance, thereby extracting white line data, side wall data of guard rails, curbstones, etc. existing along roads and solid object data such as vehicles.

Numbers which are different for each data are allocated to the white line data, the side wall data and the solid object data thus extracted. Furthermore, with respect to the solid object data, these data are classified into stopped objects, forward moving objects which move substantially in the same direction as the own vehicle 1, etc. on the basis of the relationship between the relative variation amount of the distance from the own vehicle 1 and the vehicle speed of the own vehicle 1, and then output. Furthermore, a solid object which is one of the forward moving objects protruding into the travel area of the own vehicle 1, continuously detected for a predetermined time and also nearest to the own vehicle 1 is registered as a preceding vehicle.

As described above, in this embodiment, the stereo camera 3 and the stereo image recognizing device 4 constitutes the front-side environment recognizing unit.

The detection of the driver's visual line position in this embodiment is performed by a so-called pupil/cornea reflection method. Accordingly, the visual field camera 5 is a camera having an infrared CCD, and the infrared lamp 6 is an LED lamp. According to the visual line position detecting device 7, a virtual image formed on the cornea by the infrared lamp 6 is translated through eye movement due to the difference in rotational center between the cornea and the eye ball, and this translation of the virtual image is detected by the visual field camera 5 with the center of the pupil as a reference while simultaneously detecting the center of the pupil, thereby detecting the visual line position. The detection of the visual line position is not limited to the above detection method, and it may be performed by using other detection methods (EOG (Electro-Oculography) method, a sclera reflection method, a cornea reflection method, a search coil method, etc.). That is, the visual field camera 5, the infrared lamp 6 and the visual line position detecting device 7 are provided as the visual line position detecting unit.

The control unit 8 is supplied with the information on the travel road of the own vehicle, the travel area information, the preceding vehicle information and the information of the solid objects other than the preceding vehicle from the stereo image recognizing device 4, the signal of the visual line position of the driver from the visual line position detecting device 7 and the vehicle speed of the own vehicle from the vehicle speed sensor 11.

The control unit 8 achieves the visual line position coordinate (x1, y1) on the basis of the driver's visual line position from the visual line position detecting device 7 (FIG. 3A), and converts the visual line position coordinate (x1, y1) to the coordinate (x2, y2) on a pickup image of one camera of the stereo camera 3 (for example, the camera picking up an image as a reference image when stereo matching is carried out) (FIG. 3B). Then, the control unit 8 adds the distance information based on the distance image corresponding to the converted coordinate (x2, y2) as z coordinate to the above coordinate (x2, y2), and generates a three-dimensional coordinate (x2, y2, z2) having the distance information for each coordinate (FIG. 3C). That is, z2 is set as an estimated driver's gazing distance. In the example of FIG. 3C, the distance to the preceding vehicle is estimated as the driver's gazing distance.

Here, the coordinate (x1, y1) and the coordinate (x2, y2) are relative coordinates with the center of the plane as an origin, however, the three-dimensional coordinate (x2, y2, z2) added with z2 can be regarded as the absolute coordinate.

Furthermore, with respect to the coordinate conversion from the coordinate (x1, y1) to the coordinate (x2, y2), for example, the following calculation can be performed as a simplified calculation.

That is, when the resolution of the image at the driver's visual line position is represented by a×b (pix) and the resolution of an image of one camera of the stereo camera 3 which picks up the image for the coordinate conversion is represented by c×d (pix), $$x2=(c/a)\cdot x1 \quad (1)$$

$$y2=(d/b)\cdot y1 \quad (2)$$

The above equations (1) and (2) pay no attention to the errors caused by the displacement between the image at the visual line position of the driver and the image from the stereo camera 3, etc. However, "which target (solid object, white line or the like) the driver gazes at" on the screen is actually important, and such a matter as to "which position of which target (solid object, white line or the like) the driver gazes at" is not required. Therefore, it is unnecessary to attach high importance to the precision.

Furthermore, when the visual line position coordinate (x1, y1) is achieved on the basis of the driver's visual line position from the visual line position detecting device 7 as in the case of this embodiment, only one eye data such as left-eye monocular data or right-eye monocular data may be used. However, when both the right and left eye data are used, the coordinate position can be achieved with higher precision. If one-eye data is frequently defective data when both the right and left eye data are achieved, a parallax correction value of the right and left eye data may be used.

The control unit 8 sets an alarm area at the front side, and judges whether a solid object as an alarm target exists in the alarm area. If a solid object as an alarm target (target solid object) exists, the control unit 8 compares the driver's gazing distance (that is, z2) calculated as described above with the distance L to the target solid object. If the distance L to the target solid object is equal to or smaller than the gazing distance z2, a normal alarm state (first alarm) is set. If the distance L to the target solid object is larger than the gazing distance z2, an alarm state (second alarm) having a lower frequency than the first alarm is set.

That is, as shown in FIG. 4A, when the distance L to the target solid object is equal to or smaller than the gazing distance z2 (L≦z2), an alarm is given in all the cases where an alarm flag stands. However, as shown in FIG. 4B, when the distance L to the target solid object is larger than the gazing distance z2 (L>z2), an alarm is not necessarily given in all the cases where an alarm flag stands, but some cases are thinned out from the cases of the fist alarm state to set an alarm state (second alarm) having an alarm frequency lower than the first alarm. In other words, when the target solid object is equal to or smaller than the gazing distance z2, the alarm state is set to have a higher alarm frequency than the alarm state when the distance to the target solid object is larger than the gazing distance z2.

Furthermore, according to this embodiment, in the case where the coordinate conversion from the coordinate (x1, y1) to the coordinate (x2, y2) is carried out, when there is detected such abnormality that the coordinate (x2, y2) is out of the coordinate area of the pickup image of the stereo camera 3 and this abnormality is continued for a predetermined time or more (for example, 5 seconds or more), it is judged that the driver pays no attention to the front side, and thus an alarm for making the driver pay attention to the front side of the vehicle (hereinafter referred to as forward caring alarm) is generated. This alarm is carried out by a message "please proceed with caution" or the like with voice or the like.

As described above, the control unit 8 is constructed to have functions as the gazing distance estimating unit and the alarm unit.

Next, an alarm control program executed in the control unit 8 will be described with the flowchart of FIG. 2. First, necessary information is read in step (hereinafter abbreviated to "S") 101.

Subsequently, the processing goes to S102 to judge whether image information is achieved by the stereo camera 3. If no image information is achieved, the processing directly drops out of the program.

If image information is achieved, the processing goes to S103 to judge whether visual line position information is achieved by the visual line position detecting device 7. If no visual line position information is achieved, the processing directly drops out of the program.

If visual line position information is achieved, the processing goes to S104 to achieve the visual line position coordinate (x1, y1) from the visual line position information.

Thereafter, the processing goes to S105 to convert the visual line position coordinate (x1, y1) to the coordinate (x2, y2) which can be expressed on the plane of the stereo camera 3 by using the above equations (1) and (2).

Subsequently, the processing goes to S106 to judge whether the converted coordinate (x2, y2) is normal or not, that is, whether there is such abnormality that the coordinate (x2, y2) is out of the area of the coordinate based on the stereo camera 3. If there is such abnormality, the processing goes to S107 to judge whether this abnormality state continues for a predetermined time or more (for example, 5 seconds or more). If the abnormality state continues for the predetermined time or more, it is judged that the driver pays no attention to the front side of the own vehicle, and the processing goes to S108 to generate a forward caring alarm such as a message "please proceed with caution" or the like with voice or the like, and then directly drops out of the program.

On the other hand, if as a judgment result of the S106, the converted coordinate (x2, y2) is judged as being normal, the processing goes to S109 to add the distance information based on the distance image picked up by the corresponding stereo camera 3 as z coordinate to the coordinate (x2, y2) converted in S105, thereby generating the three-dimensional coordinate (x2, y2, z2) having the distance information for each coordinate. Here, z2 corresponds to the estimated driver's gazing distance.

Subsequently, the processing goes to S110 to set an alarm area in front of the vehicle. This alarm area is set in accordance with the speed of the own vehicle, for example, and it is set to be longer in front of the own vehicle as the speed of the own vehicle is higher. Furthermore, the width of the alarm area is set to about 1.3 m in each of the right and left directions from the travel road of the own vehicle.

Subsequently, the processing goes to S111 to judge whether a solid object exists in the alarm area set in S110. If no solid object exists, the processing directly drops out of the program. Conversely, if some solid object exists, the processing goes to S112 to extract the nearest solid object in the alarm area as an alarm target solid object. Here, the distance to the target solid object is represented by L.

Subsequently, the processing goes to S113 to compare the distance L to the target solid object with the driver's gazing distance z2. If the distance L to the target solid object is equal to or less than the driver's gazing distance z2 (for L≦z2), the first alarm for giving an alarm in all the cases where the alarm flag stands is carried out as shown in FIG. 4A, thereby promoting the driver to pay attention to darting into the front side of the own vehicle, etc., and then the processing drops out of the program.

That is, when the driver pays his/her attention to a far place, an object existing at a near place to the own vehicle is out of the driver's attention. Therefore, crash or the like may occur with higher probability in accordance with the behavior of the obstacle concerned (the behavior of darting into the front side or the like). Therefore, by carrying out the first alarm, the driver's attention is called.

On the other hand, if as a comparison result of S113 it is judged that the distance L to the target object is larger than the driver's gazing distance z2 (for L>z2), the alarm is not carried out in all the cases where the alarm flag stands, but an alarm state having a lower frequency (second alarm) is set by thinning out some cases from the first alarm as shown in FIG. 4B. Thereafter, the processing drops out of the program. That is, in the second alarm, the hassle to the alarm can be reduced.

As described above, according to the embodiment of the present invention, the alarm control on the target solid object is carried out while not only the driver's gazing direction, but also the driver's gazing distance are determined and the far and near distance based on the gazing distance is considered. Therefore, natural and proper alarm control can be performed.

In order to correct the driver's visual line position detected by the visual line position detecting device 7, the values of a seat slide amount, a seat back angle, the upper and lower position amount of the steering, an inner mirror angle, etc. may be calculated to detect the driver's head position and the driver's eye position so that the correction is carried out on the basis of the comparison with these values. Furthermore, a single-eye camera used for correction may be provided to a side pillar portion so that the driver's visual line position of the visual line position detecting device 7 is corrected on the basis of the image of the single-eye camera.

In the embodiment of the present invention, the visual line position is converted to the pickup image of one camera of the stereo camera and adapted to the distance image. However, the present invention is not limited to this embodiment, and the visual line position coordinate may be directly converted to the coordinate on the distance image.

What is claimed is:

1. A vehicle driving assist system comprising:
   a front-side environment recognizing unit for generating distance information of a front-side environment, including distance information to a field of view object;
   a visual line position detecting unit for detecting a driver's visual line position; and
   a gazing distance estimating unit which receives, as a first input, the distance information to the field of view object generated by the front-side environment recognizing unit and, as a second input, information as to the visual line position, and generates, based on the first and second inputs, an estimated value as to a driver's gazing distance to the field of view object.

2. The vehicle driving assist system according to claim 1, further comprising:
an alarm unit for extracting an alarm target solid object from the field of view object that is recognized by the front-side environment recognizing unit and which exists in front of the vehicle and alarming over the existence of the alarm target solid object,
wherein an alarm of the alarm unit is set in accordance with a distance to the alarm target solid object and the driver's gazing distance.

3. The vehicle driving assist system according to claim 2, wherein when the distance to the target solid object is equal to or less than the gazing distance, the alarm of the alarm unit is set to have a higher frequency than the alarm when the distance to the target solid object is larger than the gazing distance.

4. The vehicle driving assist system according to claim 1, wherein the front-side environment recognizing unit generates a distance image representing a three-dimensional distance distribution on a basis of a displacement amount of corresponding positions of a pair of pickup images, and the gazing distance estimating unit estimates the driver's gazing distance on a basis of the visual line position to the distance image.

5. The vehicle driving assist system according to claim 1 wherein the estimated value as to a driver's gazing distance to the field of view object is based on a z-axis extension coordinate, with the z-axis extension coordinate being based on the distance information determined by the front-side environment recognizing unit and is added to an x-y coordinate value set associated with the front-side environment recognizing unit to achieve a three dimensional actual coordinate.

6. A vehicle driving assist system comprising:
a monitor including an object detection sensor for sensing an object in a field of view and a calculator for calculating a distance information to the object;
a detector for detecting a driver's sight line position; and
an estimator for estimating a driver's gazing distance to the object lying at the end of a driver's sight line based on receipt of a first input of information as to the driver's sight line position and a second input of information as to the distance information to the object.

7. The vehicle driving assist system according to claim 6, further comprising:
a control unit for determining the object sensed by the monitor as a target in case that said object is in a predetermined region; and
an alarm,
wherein said alarm is activated in accordance with the distance to the target and the driver's gazing distance.

8. The vehicle driving assist system according to claim 7, wherein the target is a solid object that is closest to the vehicle.

9. The driving assist system according to claim 7, wherein when the distance to the target is equal to or less than the driver's gazing distance, the alarm is activated at a higher frequency than when the distance to the target is larger than the driver's gazing distance.

10. The vehicle driving assist system according to claim 7, wherein the object detection sensor comprises a pair of stereo cameras taking a pair of reference and comparative images, and the calculator calculates the distance information to a point on the reference image on a basis of a displacement amount of corresponding positions on the pair of images, wherein said distance information includes three-dimensional coordinates having two coordinates perpendicular to the reference image as an x-coordinate and a y-coordinate, and another coordinate perpendicular to the reference image as a z-coordinate.

11. The vehicle driving assist system according to claim 6 wherein the estimated driver's gazing distance is based on a z-axis extension coordinate, with the z-axis extension coordinate being based on the distance information calculated by the monitor and is added to an x-y coordinate value set associated with the monitor to achieve a three dimensional actual coordinate.

12. A vehicle driving assist system comprising:
a monitor including an object detection sensor for sensing an object in a field of view and a calculator for calculating a distance information to the object;
a detector for detecting a driver's sight line position;
an estimator for estimating a driver's gazing distance to the object lying at an end of a driver's sight line on a basis of the driver's sight line position and the distance information to the object;
a control unit for determining the object sensed by the monitor as a target in case that said object is in a predetermined region; and
an alarm,
wherein said alarm is activated in accordance with the distance to the target and the driver's gazing distance, wherein the object detection sensor comprises a pair of stereo cameras taking a pair of reference and comparative images, and the calculator calculates the distance information to a point on the reference image on a basis of a displacement amount of corresponding positions on the pair of images, wherein said distance information includes three-dimensional coordinates having two coordinates perpendicular to the reference image as an x-coordinate and a y-coordinate, and another coordinate perpendicular to the reference image as a z-coordinate, and wherein the estimator estimates that the driver's gazing distance is the z-coordinate of an intersection point of the driver's sight line position with the reference image.

* * * * *